United States Patent [19]

Bell

[11] Patent Number: 4,770,123

[45] Date of Patent: Sep. 13, 1988

[54] RESILIENTLY COMPRESSIBLE MOUSE TOY

[75] Inventor: Audrey R. Bell, Perry, Ohio

[73] Assignees: Virginia D. Bell; Jean R. Bell, both of Perry, Ohio ; a part interest to each

[21] Appl. No.: 41,990

[22] Filed: Apr. 24, 1987

[51] Int. Cl.⁴ .............................................. A01K 15/00
[52] U.S. Cl. ...................................... 119/29; 446/370
[58] Field of Search ................. 119/29, 29.5; 446/369, 446/370, 385, 374

[56]  References Cited

U.S. PATENT DOCUMENTS

| | | | |
|---|---|---|---|
| 1,149,170 | 8/1915 | Allis | 119/29 X |
| 1,925,895 | 9/1933 | Biber | 446/370 |
| 2,577,466 | 12/1951 | Jones | 24/115 H |
| 2,808,632 | 10/1957 | Cline | 24/115 H |
| 4,074,657 | 2/1978 | Senior et al. | 119/29 |
| 4,223,636 | 9/1980 | Dishong | 119/29 |
| 4,385,759 | 5/1983 | Everroad | 272/75 |

Primary Examiner—Robert Peshock
Attorney, Agent, or Firm—Cullen, Sloman, Cantor, Grauer, Scott and Rutherford

[57]  ABSTRACT

A toy is formed of an elongated, resilient tube with an elongated leather thong-like strip passing through the tube and extending outwardly of the ends of the tube. A knot is formed at one end of the strip to abut the adjacent tube end and to form a stop. The end portion of the strip that extends from the knot is bent back into the inner tube to provide a double thickness strip within a portion of the length of the inner tube. An outer tube formed of a fur-like material, formed of an inner cloth-like sheet with outwardly extending fibers, covers the inner tube. The elongated opposite end of the strip extends outwardly of the inner and outer tubes a considerable distance. The toy is resiliently bendable and compressible, with the amount of compression limited by the contact between the inner tube and the strip so that the portion of the tube which has the double thickness strip within its comprsses to a lesser double thickness strip within it compresses to a lesser amount than the remainder of the tube.

10 Claims, 1 Drawing Sheet

U.S. Patent    Sep. 13, 1988    4,770,123
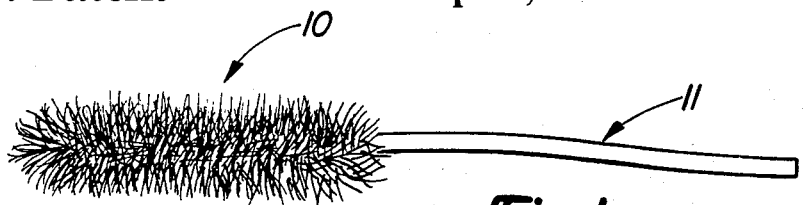
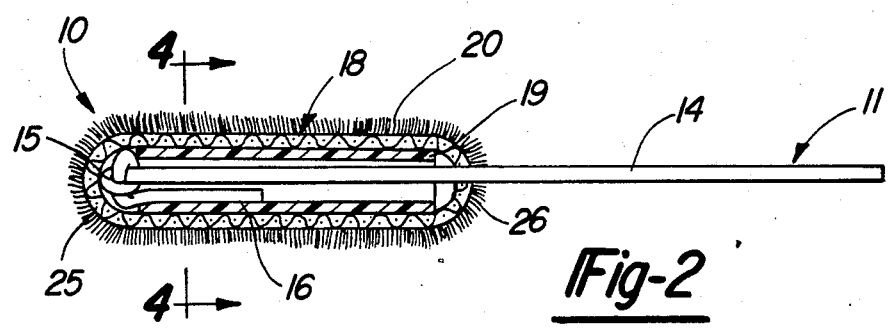
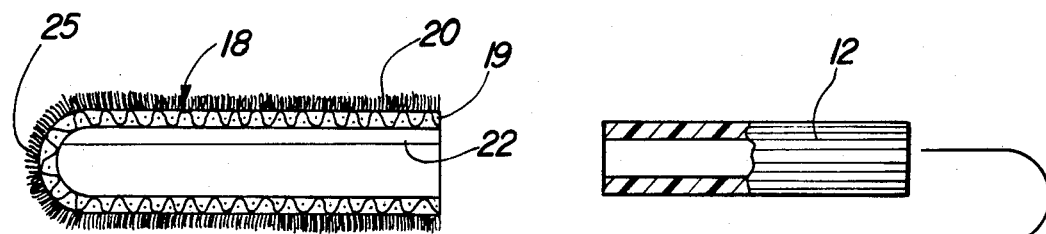
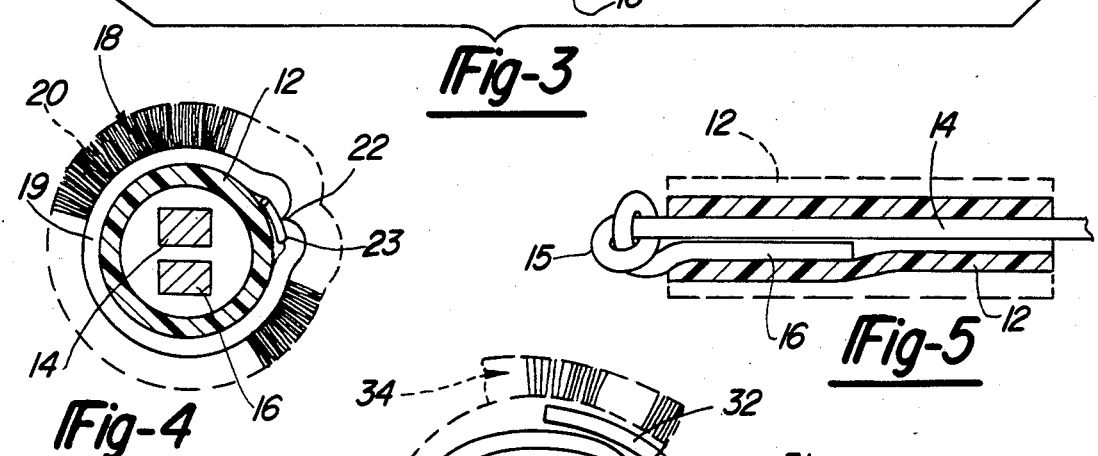
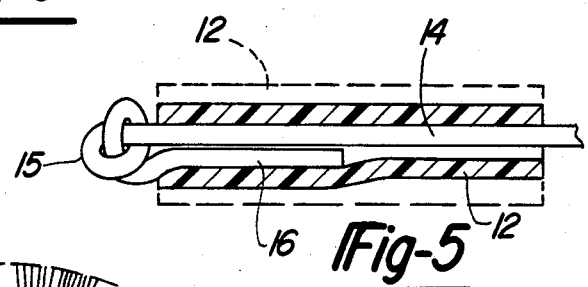
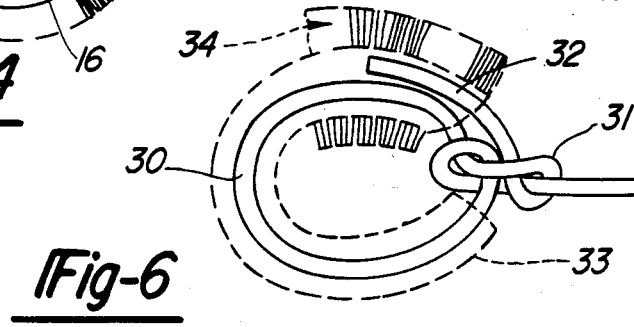

4,770,123

RESILIENTLY COMPRESSIBLE MOUSE TOY

BACKGROUND OF INVENTION

This invention relates to a toy, which generally simulates the appearance of a mouse or small mouse-like animal. This toy is particularly designed for play by pet cats, although it may be used by other types of pets, as well as by human children.

Mouse-like toys of various types are well-known and are commercially available in different forms. For example, such toys have been made of resilient rubber-like molded materials, as well as of sewn cloth constructions of various designs. Cloth construction toys have a limited life either because they can be damaged easily after a short period of play or because the cats lose interest in them after a relatively short time, or both. This, this invention concerns a cloth construction toy that resists damage and that has a shape and a feel which are attractive to pet cats for long periods of time.

SUMMARY OF INVENTION

This invention contemplates a generally mouse-like shaped toy which is made of an inner, elongated, resilient tube, through which a long leather thong or strip is passed, with an outer, fur-like, pile material tube completely covering the inner tube. One end of the thong is tied, to prevent its removal from the inner tube, and the opposite end extends outwardly of the resilient tube a considerable distance to form a tail.

The knot formed at the end of the strip engages the adjacent, inner tube end to act as a stop. But the strip also has an end portion which is bent back into the tube to form a double thickness strip for part of the length of the tube. Consequently, the toy may be forcibly compressed along its length, as by the jaws of a pet cat, but the amount of compression will vary along its length. That is, one end of the toy is less compressible, due to the double thickness strip within the inner tube, while the opposite end, from which the long tail-like strip extends, will be more compressible due to the single strip thickness within the inner tube. The amount of inward compression is determined by the difference between the diameter of the inner, resilient tube relative to the cross-sectional size and shape of the strip.

The inner resilient tube permits the toy to be twisted, distorted and bent, as well as compressed, but will restore the fur-like toy to its original shape upon release of any compressive or distorting forces. Thus, the toy simulates a small rodent, like a mouse with a long tail, which will attract a cat for long periods of time due to the feel, appearance, compressibility and differential in compression along its length. Nevertheless, the simple construction is strong enough to last a long time under the abuses of the play of a cat.

A primary object of this invention is to form a mouse-like toy which is extremely durable and which will remain attractive for long periods of time for a typical pet cat. The toy is made of several inexpensive and easily produced parts which are made and assembled with only a small amount of labor and materials.

A further object of this invention is to provide a small, mouse-like toy which is flexible and compressible at different amounts along its length and which self-restore its shape upon release or relaxation of forces applied to it.

Yet another object is to provide an attractive mouse-like toy which can be attractive to pets and to human children and has a tendency to maintain the attention of the user for relatively long periods of time.

These and other objects and advantages of this invention will become apparent upon reading the following description, of which the attached drawings form a part.

DESCRIPTION OF DRAWINGS

FIG. 1 is an elevatioal view of the toy.

FIG. 2 is a cross-sectional, elevational view of the toy.

FIG. 3 is a partially cross-sectional view of the toy with its three parts disassembled.

FIG. 4 is an enlarged, cross-sectional view taken in the direction of arrows 4—4 of FIG. 2.

FIG. 5 is an enlarged, semi-schematic view illustrating the differential compression of the inner tube relative to the strip.

FIG. 6 is a schematic view showing a modification of the toy.

DETAILED DESCRIPTION

As shown in FIG. 1, the toy has a fur-like body 10 with an elongated tail 11. The tail may be about the same length as the body, although the tail length may be varied to be shorter or longer.

The body includes an elongated, resilient inner tube 12 which may be made of a rubber-like plastic material that is easily bent, distorted or compressed but which recovers its shape upon release of any applied forces. An elongated strip 14, preferably made of a leather thong, or leather thong-like material, of roughly uniform cross-section passes through the inner tube 12. The inner tube's interior diameter is considerably greater than the cross-section dimensions of the strip.

A knot 15 is formed at one end of the strip. This knot acts like a stop means in that it abuts the adjacent end of the inner tube 12 to prevent withdrawal of the strip from the tube. However, the end portion of the strip is bent back to form a bent end portion 16 that is positioned within the tube.

An outer tube 18 is shaped to fit around and to cover the inner tube, including the opposite ends of the inner tube. The outer tube is formed of either real or synthetic fur. Where a synthetic fur is used, it is formed of a knitted or woven cloth sheet 19 (see FIG. 4) having pile fibers 20 extending from the sheet to create a fur-like cloth. Real fur similarly has a skin, like the knitted or woven cloth of a synthetic fur, with fur fibers. Thus, the relevant descriptions of the cloth outer tube apply to either real or synthetic fur.

The initially flat sheet of cloth forming the outer tube is bent into the tube shape and is sewn or adhesively fastened along a seam 22. FIG. 4 illustrates the seam with with a sewn stitch 23.

The opposite ends of the outer tube are stitched closed, starting with a closed forward end 25 which helps shape the tube into an open end test tube shape. The inner tube, having the knotted strip in place, is inserted within the outer tube. Upon assembly, the opposite end 26 of the outer tube may be stitched closed around the strip.

As shown in FIG. 4, the interior wall of the resilient inner tube 12 is spaced away from the double thickness or single thickness strip portions sufficiently to provide room for compression of the inner tube inwardly against the strip. Thus, as illustrated in FIG. 5, the inner tube may be differentially collapsed inwardly against the strip which limits the amount of compression. This provides a different feel or effect when the toy is compressed, as by the jaws of a pet. Upon release of the pressure, the tube resiliently returns to its original shape, thereby simultaneously restoring the shape of the outer, fur-like, cloth tube.

FIG. 6 illustrates a modification of the toy. The strip 14a has its end bent into a loop 30 fastened by a knot 31 which has a loose end portion 32. The inner, elongated, resilient plastic tube 33 is bent into a loop shape by the loop shape of the strip. FIG. 6 illustrates the bent inner tube 33 in dotted lines.

Although, the size of the toy may vary, an example comprises a body portion which is about four inches long and an extending tail portion which is about the same length. The inner tube, which is short enough to permit forming the closed opposite ends on the outer tube may be formed of a suitable, thin-wall rubbery tube of roughly one-quarter inch inside diameter. Commercially available, resilient plastic tubing may be used.

The toy may be decorated, where desired, such as by sewing eyes, legs, ears and a tongue upon the body at the appropriate places. These body parts may be made of suitable, shaped cloth pieces or, in the case of the eyes, may be formed of small beads or the like. The shapes and sizes of these body parts may be varied.

An outer tube 34, illustrated schematically in dotted lines, having the fur-like pile material, is arranged around the inner tube. Thus, the toy, instead of being straight as in the case of FIGS. 1-5, is in the shape of a loop. In this form, the inner tube, instead of being of a single length, could be formed of two, three or more short sections, arranged end-to-end along the loop of the strip, although the single length tube is preferable.

Having fully described an operative embodiment of this invention, I now claim:

1. A toy comprising:
    an elongated, resilient inner tube having at least one wall, an interior and two ends opposite one another;
    an elongated, flexible, thin strip of a leather thong-like material extending through the interior of the inner tube, with a stop means holding, said strip having a knot tied at one end with the knot arranged to abut against the adjacent end of the inner tube to hold one end of the strip at one end of the inner tube, and the opposite end of the strip extending longitudinally outwardly of the opposite end of the inner tube a considerable distance;
    said inner tube having an internal diameter which is considerably greater than the cross-sectional dimensions of the strip;
    an outer tube having at least one wall, said outer tube surrounding the inner tube and being formed of a fur-like material having an interior flexible, cloth-like sheet provided with a fur-like fibers extending outwardly of the sheet;
    said strip having an elongqted end portion extending from the knot part way through the inner tube towards the opposite end of the inner tube so that said end portion and the portion of the strip which it overlaps within the inner tube form a double thickness strip extending part way through the inner tube which limits the amount of resilient compression of the inner tube as compared with the amount of resilient compression allowed by the single thickness, remaining portion of the strip extending through the remainder of inner tube, for producing a compression differential along the length of the toy;
    whereby the walls forming the tubes may be jointly compressed under radially inwardly directed force inwardly towards the strip until the inner tube contacts the strip, and the at least one wall of the inner tube will resiliently recover to its orignal shape, thereby restoring the outer tube to its original shape upon release of the force causing the compression, so that the toy may be forcibly distorted and may be partially compressed at points along its length and will recover its shape during play with the toy.

2. A toy as defined in claim 1, and said outer tube extending the full length of, and covering the opposite ends of, the inner tube.

3. A toy as defined in claim 1, and said outer tube being formed of a synthetic fur material made of a cloth base with fibers extending outwardly therefrom and said cloth base being rolled into an outer tube-shape which extends the full length of the inner tube and extends around and covers the opposite ends of the inner tube.

4. A toy as defined in claim 1, and with said opposite end of the strip extending outwardly of the tube a distance at least as great as the length of the outer tube.

5. A toy comprising:
    an elongated, resilient inner tube having at least one wall, an interior and two ends opposite one another;
    an elongated, flexible, thin strip having a portion extending through the interior of the inner tube, the portion of said strip which extends through the inner tube outwardly from one end being bent back upon itself and secured to the portion of the strip which extends outwardly of the opposite end of said inner tube to form a closed loop and secured in the loop shape by a knot, a short, free end portion of the knot extending back and through the inner tube a short distance to form a double thickness strip portion within a part of said inner tube to form a double thickness strip portion within a part of said inner tube to form a double thickness strip portion which limits the amount of resilient compression of the inner tube as compared with the amount of resilient compression of the inner tube as compared with the amount of resilient compression allowed by the single thickness portion, and the opposite end of the strip extending longitudinally outwardly of the inner tube from the knot a considerable distance;
    said inner tube having an internal diameter which is considerably greater than the cross-sectional dimensions of the strip;
    an outer tube having at least one wall, said outer tube surrounding the inner tube and being formed of a fur-like material having an interior flexible, cloth-like sheet provided with a fur-like fibers extending outwardly of the sheet;
    whereby the walls forming the tubes may be jointly compressed under radially inwardly directed force inwardly towards the strip until the inner tube contacts the strip, and the at least one wall of the inner tube will resiliently recover to its original shape, thereby restoring the outer tube to its original shape upon release of the force causing the compression, so that the toy may be forcibly distorted and may be partially compressed at points along its length and will recover its shape during play with the toy.

6. A toy as defined in claim 5, and said outer tube extending the full length of, and covering the opposite ends of, the inner tube.

7. A toy as defined in claim 5, and including said strip being formed of a leather thong-like material.

8. A toy as defined in claim 5, and said outer tube being formed of a synthetic fur material made of a cloth base with fibers extending outwardly therefrom and said cloth base being rolled into an outer tube-shape which extends the full length of the inner tube and extends around and covers the opposite ends of the inner tube.

9. A toy as defined in claim 5, and with said opposite end of the strip extending outwardly of the tubes a distance at least as great as the length of the outer tube.

10. A toy as defined in claim 5, and said inner tube being formed of a rubber-like plastic material.

* * * * *

UNITED STATES PATENT AND TRADEMARK OFFICE
CERTIFICATE OF CORRECTION

PATENT NO. : 4,770,123

DATED : September 13, 1988

INVENTOR(S) : Audrey R. Bell

It is certified that error appears in the above-identified patent and that said Letters Patent is hereby corrected as shown below:

Col. 3, line 57, the letter "a" should be omitted.
Col. 3, line 59, the word "elongqted" is misspelled and should read -- elongated--.
Col. 4, line 7, the word "the" (2nd occurrence) should be omitted.
Col. 4, lines 43-45, the words "to form a double thickness strip portion within a part of said inner tube to form a double thickness strip portion" is erroneously redundant.
Col. 4, lines 46-48, the words "the amount of resilient compression of the inner tube as compared with" are redundant.
Col. 4, line 59, the word "a" should be omitted.
Col. 4, line 64, the word "the" (2nd occurrence) should be omitted.

Signed and Sealed this

Second Day of May, 1989

Attest:

DONALD J. QUIGG

*Attesting Officer*   *Commissioner of Patents and Trademarks*